Patented Feb. 6, 1951

2,540,155

UNITED STATES PATENT OFFICE 2,540,155

PROCESS FOR THE PREPARATION OF
1-DIBENZYLAMINO- 2 -HALOETHANES
AND SALTS THEREOF

Thomas F. Wood, Clifton, N. J., assignor to Burton T. Bush, Inc., New York, N. Y., a corporation of New Jersey No Drawing. Application June 5, 1948,
Serial No. 31,407

6 Claims. (Cl. 260—570.9)

This invention relates to a novel process for preparing 1-dibenzylamino - 2 - haloethanes and salts thereof.

The products made in accordance with my process have recently found medical significance of unusual degree. Recent and current medical literature include a number of reports on scientific investigations which clearly tend to establish the unique sympatholytic and adrenolytic characteristics of these substances. Unfortunately, however, as in the case of many newly-found medicinal agents, the cost of the aforementioned products is quite high. It would represent a considerable advance, consequently, if the cost could be reduced. My present invention is believed to represent such an advance.

I have found that excellent yields of the amino haloethanes can be obtained in accordance with my technically-feasible novel process which comprises treating 1-amino-2-haloethane hydrohalides or 1-benzylamino - 2 - haloethane hydrohalides with benzyl halides in the presence of a neutralization or so-called acid-binding agent at elevated temperatures. The resulting amino haloethanes can be readily isolated and purified by filtration and vacuum distillation.

If desired, the salts of the amino haloethanes may be prepared from the crude or purified amino haloethanes by treating the latter with suitable amounts of acids such as hydrochloric, hydrobromic, sulfuric, nitric or phosphoric acids.

As far as I am aware, no suitable method has previously been available for the aralkylation of 1-amino - 2 - haloethanes and 1-benzylamino-2-haloethanes. These substances are difficult to isolate in the pure state owing to their instability and strong tendency to undergo reactions involving increase in their molecular size. Such amines have been isolated in the form of their salts, such as their hydrochlorides or hydrobromides, and when the free amines have been desired they have been liberated from their salts by treatment with alkali in a suitable solvent.

Even after the aforementioned costly purification process is followed in order to obtain the amino haloethanes in reasonably pure condition, it has been found that known aralkylation processes, involving the treatment with benzyl halides to form the corresponding salts of the benzyl-substituted amino haloethanes followed by liberation of the free amines by treatment with alkali, do not yield the desired products. Instead, large quantities of high melting material, probably dimers or polymers of the desired amines, are obtained.

In view of the foregoing it was surprising to find that the desired dibenzyl-substituted 1-amino-2-haloethanes could be prepared in excellent yields by treating the salts of either the 1-amino-2-haloethanes or 1-benzylamino-2-haloethanes with benzyl halides in the presence of acid-binding agents. Upon completion of the benzylation, the desired free amines can be obtained in substantially pure form by suitable distillation preceded by a filtration.

Among the salts which I may use as starting materials in my process are 1-amino-2-chloroethane hydrochloride, 1-amino-2-bromoethane hydrochloride, 1-amino-2-chloroethane hydrobromide, 1-amino-2-bromoethane hydrobromide, 1-benzylamino-2-chloroethane hydrochloride, 1-benzylamino-2-bromoethane hydrochloride, 1-benzylamino-2-chloroethane hydrobromide and 1-benzylamino-2-bromoethane hydromide.

As benzylating agents benzyl chloride or benzyl bromide may be used.

My novel process may be conducted in the presence of suitable solvents, if desired. Examples of such solvents are benzene and toluene, but other solvents which are inert under the reaction conditions and which are capable of forming azeotropes with water can be used. I have found that excellent results are obtained if no solvent at all is employed other than an excess of the benzyl halide itself.

As the acid-binding agent I have found that sodium carbonate and sodium bicarbonate give excellent results. Other alkali metal carbonates and bicarbonates give satisfactory results, as well as alkaline earth metal carbonates and bicarbonates. The recitation of the foregoing acid-binding agents is not to be taken as limiting my invention thereto, for even such a strong acid-binding agent as sodium hydroxide can be used to effect my process; the use of such a strong agent not being recommended for best results, however.

With regard to the amounts and concentrations of the reactants, these may be varied over wide limits as will be understood by organic chemists. It is advantageous to use at least from 2 to 4 moles of benzyl halide per mole of 1-amino-2-haloethane hydrohalide or 1-benzylamino-2-haloethane hydrohalide. Enough acid-binding agent to fix or neutralize 2 moles of hydrohalide for each mole of amino haloethane hydrohalide used should be employed. When alkali metal carbonates and bicarbonates such as sodium carbonate or sodium bicarbonate are employed it has been found that an excess of from about 10 to about 30 percent of these reagents, over the theoretical amounts, gives advantageous results.

The temperature and time of reaction may also vary and depend in part on factors such as the solvent, if any, used and the reactants employed. Temperatures within the range of from about 30° C. to about 150° C. give satisfactory results but I prefer to employ temperatures between about 50° C. and 120° C.

The reaction period varies from a few hours to a few days. When sodium bicarbonate is employed the reaction is sufficiently complete in 6 to 8 hours at 70°–80° C.; while in the case of sodium carbonate from 24 to 36 hours are required for completion of the reaction under the same conditions.

Atmospheric and sub-atmospheric pressures can be employed in my process. Pressures as low as about 20 to 30 mm. of mercury have given satisfactory results.

The amino haloethane hydrohalides employed as starting materials in my process are easily made from commercially available materials. For example, 1-amino-2-chloroethane hydrochloride can be made in nearly quantitative yield by converting commercial anhydrous 1-amino-2-ethanol into its hydrochloride, followed by treatment with thionyl chloride. Also, 1-benzylamino-2-chloroethane hydrocloride (M. P. 196°–198° C.) can be prepared in high yield by condensing benzaldehyde with 1-amino-2-ethanol, followed by catalytic hydrogenation to yield 1-benzylamino-2-ethanol, which is then treated with thionyl chloride at 70°–80° C. or first converted into its hydrochloride and then treated with thionyl chloride at 70°–80° C.

In order more fully to describe my invention the following examples are given. It is understood that they are for purposes of illustration and not limitation.

EXAMPLE 1

*Preparation of 1-dibenzylamino-2-chloroethane hydrochloride*

A thick slurry of:

198 grams of 1-benzylamino-2-chloroethane hydrochloride (0.965 mole), of crude hydrochloride equaled 87 percent of theory. The crude hydrochloride was dissolved in 600 grams of n-butanol at 85° C. and, after stirring with 5 percent of decolorizing carbon for 15 minutes, was filtered. On cooling and filtering off the crystals and drying, there was obtained 202 grams of snow-white 1-dibenzylamino-2-chloroethane hydrochloride, M. P. 192°–194° C.

EXAMPLE 2

*Preparation of 1-dibenzylamino-2-chloroethane hydrochloride*

Into a 1-liter, 3-neck flask provided with an agitator, thermometer and reflux condenser was placed:

200 grams of benzyl chloride (1.58 mole) and 80 grams of sodium carbonate (soda ash) (0.75 mole).

There was added with stirring:

29 grams of 1-amino-2-chloroethane hydrochloride (0.25 mole).

The mixture was warmed to 50° C. and stirred for 25 hours at 50°–58° C. The salt was filtered off and washed with 120 cc. of warm benzol. This was combined with the filtrate. On cooling and standing, there separated from the solution 5 grams of crystalline material which was filtered off and found to be 2-oxazolidone. After distilling off the benzol and removing excess benzyl chloride under reduced pressure, there was obtained 49 grams of reddish yellow liquid. This was dissolved in an equal weight of alcohol and the hydrochloride was formed by passing in HCl gas. There was obtained 18 grams of 1-dibenzylamino-2-chloroethane hydrochloride, M. P. 192°–194° C.

The foregoing illustrates my invention, which however is not to be limited thereby but is to be construed as broadly as permissible in view of the prior art and limited solely by the appended claims.

I claim:

1. The process for preparing 1-dibenzylamino-2-haloethanes, which comprises reacting a sub- 6. The process for preparing 1-dibenzylamino-2-chloroethane, which comprises reacting about 1 mole of 1-benzylamino-2-chloroethane hydrochloride and about 2 to 4 moles of benzyl chloride in the presence of at least about 2 moles of sodium bicarbonate at a temperature within the range of about 50° C. to about 120° C.

THOMAS F. WOOD.

REFERENCES CITED

The following references are of record in the file of this patent:

UNITED STATES PATENTS

| Number | Name | Date |
|---|---|---|
| 1,949,247 | Eisleb | Feb. 27, 1934 |

OTHER REFERENCES

Peacock: J. Chem. Soc. (London), vol. 125, pages 1975–1980 (1924).